# 3,254,002
METHOD FOR PRODUCING GLUTAMIC ACID
John C. Megna, Bakersfield, and Richard D. Boucher, San Jose, Calif., assignors to International Minerals & Chemical Corporation, a corporation of New York
No Drawing. Filed Jan. 7, 1963, Ser. No. 249,605
4 Claims. (Cl. 195—47)

This invention relates to the preparation of L-glutamic acid and more particularly relates to the preparation of L-glutamic acid from carbohydrates utilizing biological means.

Throughout recent years, the microbiological production of L-glutamic acid has been intensively investigated on a world-wide scale. While these investigations have not provided a clear-cut method of identifying any class of L-glutamic acid producing microorganisms, extensive random screening has provided several microorganisms said to be capable of accumulating L-glutamic acid in fermentation broths. Such microorganisms are identified, inter alia, in Canadian Patent 604,712 (*Micrococcus glutamicus*); Canadian Patent 625,387 (*Brevibacterium divaricatum*); Canadian Patent 633,170 (*Microbacterium flavum*); Belgium Patent 609,701 (*Corynebacterium lilium* and *Corynebacterium callunae*); and U.S. Patent 3,032,474 (*Bacillus mageterium-cereus*).

The efficiency of L-glutamic acid-producing organisms is, of course, of utmost concern. It is not only desirable that the fermentation be carried out in a relatively short period of time, but it is critical to the economics of any process that the organism convert a significant percent of the principal substrate to L-glutamic acid. In order to obtain the highest efficiency possible, the art has continued screening efforts and, additionally, has turned its attention to the proper balance of secondary nutrients in the fermentation medium.

In the course of optimizing the secondary nutrients for the fermentation medium, it has been determined that some microorganisms are biotin sensitive and biotin should be maintained at a low level which will vary somewhat from microorganism to microorganism. Since microorganisms manufacture glutamic acid for their own cell synthesis, it appears that the low levels of biotin adversely effect the assimilation of glutamic acid through the cell wall and into cell chemistry. Thus, the microorganism continues to produce glutamic acid, but is unable to utilize it sufficiently to consume all that is produced.

In another approach, the addition of an antibiotic to the fermentation medium has been suggested (e.g., French Patent 1,266,757). It apparently is postulated that the antibiotic will affect the cell chemistry so that the cell will be unable to assimilate L-glutamic acid as rapidly as it is produced.

As in any fermentation, the proper balance of all common secondary nutrients is also necessary to achieve optimum results. This balance will vary with conditions and with the microorganism employed, but is within the ordinary skill of the art.

While optimization of secondary nutrients in the medium can provide increased efficiency in fermentations, it is encumbered by inherent restrictions in its application. For example, attempts to regulate the biotin content of the medium preclude the utilization of high biotin secondary nutrients and, indeed, preclude the utilization of high-biotin primary nutrients such as molasses and the like. The efficiency of antibiotics varies from microorganism to microorganism and requires rather delicate control. In addition, of course, the antibiotic constitutes an added expense in the process.

Accordingly, it is a primary object of this invention to provide a means whereby the efficiency of L-glutamic acid fermentations may be increased.

It is a further object of this invention to provide a method whereby biotin-containing materials may be employed in fermentation mediums without sacrificing the efficiency of the process.

The present invention relates to the aerobic fermentation of an aqueous carbohydrate medium containing a nitrogen source with an L-glutamic acid-producing microorganism and constitutes the improvement of incrementally adding the carbohydrate nutrient to the medium to maintain a carbohydrate level in the medium of less than about 2%.

The practice of this invention permits an increase in molecular conversion of carbohydrate to L-glutamic acid without extending the fermentation time. Although the carbohydrate is maintained at a low level, the overall time required for the process of the present invention is equal to or less than the time required for a batch process containing the same total carbohydrate at the outset. In applicants' preferred embodiment, the content of carbohydrate in the medium may be maintained sufficiently low to function as a control on growth and, therefore, on the assimilation of L-glutamic acid by the organism. In this embodiment, the biotin content of the medium is not critical and high biotin content materials such as beet molasses readily may be employed in the process. The process of this invention also permits the accumulation of higher percentage of free glutamic acid in the fermentation broth.

The invention generically contemplates fermentation mediums containing carbohydrates including sugar, dextrins and the like. Moreover, as indicated above, the invention is generically applicable to glutamic acid-producing microorganisms. *Corynebacterium lilium* typified by NRRL–B–2243 and *Corynebacterium callunae* typified by NRRL–B–2244 constitute preferred microorganisms for the practice of the invention.

The medium appropriate for the production of glutamic acid will, of course, vary somewhat from microorganism to microorganism. These mediums, however, are aqueous and will contain in addition to a carbohydrate and nitrogen source, secondary nutrients such as calcium, magnesium, potassium, zinc, phosphate, sulfate, auxiliary growth factor and minor elements.

Sugars, such as glucose, sucrose, fructose, maltose, and the like, as well as mixture of such sugars, most appropriately may be employed in the practice of this invention. Glucose and sucrose constitute particularly preferred materials for this invention. As employed herein, tht terms "sugar," "starch," and the like embrace not only such materials, per se, but their obvious equivalents. For example, the term "glucose" embraces materials such as "Cerelose" (Corn Products Company) and "Clintose" (Clinton Corn Processing Company), which are commercially available forms of glucose monohydrate prepared by hydrolysis of corn starch. The terms also embrace invert sugar mixtures, such as those prepared by acid conversion of sugars in a known manner. Further, the term includes biotin-containing carbohydrates such as beet molasses and the like.

Biotin-containing materials having from about $0.02\gamma$ of biotin per gram of carbohydrate to about $0.3\gamma$ of biotin per gram of carbohydrate generally are not satisfactory for commercial batch processes. Such materials, however, are suitable for the practice of this invention. Materials containing not more than about $0.3\gamma$ of biotin per gram of carbohydrate may be employed for this invention and materials having from about 0.03 to about $0.17\gamma$ of biotin per gram of carbohydrate are particularly preferred for this invention.

The medium will also contain a standard nitrogen source, such as ammonia, urea, or other assimilable nitrogen source, either organic or inorganic. Various ammonium compounds can be used, including chlorides, sulfates, phosphates, and others. The nitrogen and phosphate can be added together as an ammonium phosphate, or separately, as desired. Preferably, at least sufficient nitrogen is present during the process to supply nitrogen for cell growth and for theoretical conversion of all the carbohydrate to glutamic acid. The total nitrogen source can be added at the outset or can be added periodically during the fermentation.

Auxiliary growth factors may also be added to the medium. These may be biotin, or biotin equivalents (i.e., a substance having the biological action of biotin), or in the form of biotin precursor compound (i.e., a substance which is converted biotin or a biotin equivalent under the fermentation conditions). Other secondardy growth factors such as thiamin and the like, may also be employed. Suitable sources of the auxiliary growth factors which may be used alone or in combination include meat extract, peptone, corn steep water, and a commercially available product known as "Protopetone No. 366," supplied by Wilson & Company. The above materials are available from commercial sources and many also supply minor elements.

A variety of calcium, potassium, and magnesium salts may be employed in the fermenation medium including the chlorides, sulfates, phosphates, and the like. Similarly, phosphate and sulfate ions can be supplied as any of a variety of salts. While salts which supply both the desired anion and cation may be employed (e.g., potassium phosphate, magnesium sulfate) the selection is by no means so limited. Again, such materials are conventional in fermentation mediums and the selection of specific materials as well as their proportion is within the skill of the routineer.

The so-called "minor elements" are commonly understood to include manganese, iron, zinc, cobalt, and possibly others. Trace quantities thereof are required, and such quantities are commonly present in the materials used in the preparation of fermentation mediums. Minor elements are also readily available from commercial sources.

Finally, the medium will contain a non-toxic alkali or buffer to maintain the pH in the desired range. Once more a wide variety of non-toxic materials may be utilized. Because they are readily available, calcium carbonate or ammonia (gaseous or aqueous) often are employed to maintain the pH of fermentation mediums.

In practicing the invention, the fermentation medium is inoculated with a culture of the microorganism and the microorganism is permitted to adjust to the medium for an initial growth period. This initial period is not critical to the process and appropriate periods will be apparent to those skilled in the art. Generally, however, this growth period will be from about 1 to about 8 hours.

The initial fermentation medium may contain all appropriate secondary fermentation nutrients. The primary carbohydrate nutrient, however, should be present only in weight amounts of less than about 3%, preferably less than about 2%. When biotin-sensitive microorganisms are employed in the practice of the invention, it is desirable that the initial medium contain not more than about $10\gamma/l$. of biotin, preferably less than about $7.5\gamma/l$. The pH of the medium desirably should be between about 5 and about 9 and preferably between about 6 and about 8. Further, the medium should be maintained at a temperature of from about 20 to about 40° C. and preferably from about 25 to about 35° C. Both temperature and pH conditions should be maintained within the stated ranges throughout the fermentation.

After the initial growth period, the carbohydrate is added to the medium incrementally to maintain a carbohydrate level of not more than about 2%. In the preferred embodiment and when the biotin content of the medium is a significant factor and carbohydrates containing significant amounts of biotin are employed, the carbohydrate content of the medium is maintained at not more than about 1% and desirably not more than about 0.5% by weight of the total medium. The term "incremental" as employed herein contemplates the continuous addition of carbohydrate or, alternatively, the periodical addition of minute amounts of carbohydrate. It will be apparent that the secondary nutrients also can be added incrementally to the medium.

The fermentation is, of course, aerobic and, therefore, is carried out in the presence of oxygen and with agitation. The optimum oxygen absorption rate and agitation will vary somewhat, depending upon the medium and the microorganism employed, but is within the skill of the routineer.

The overall time of the fermentation may vary rather widely, but generally the fermentation will terminate at between about 20 to about 50 hours. Usually, the fermentation will be terminated when the accumulation of glutamic acid in the medium is no longer rapid. The total carbohydrate added to the medium may vary, but preferably at least 7.5% by weight of the medium is added. Carbohydrate in amounts from about 10% to about 20% by weight of the medium readily may be added.

The recovery of L-glutamic acid from the fermentation liquor can be carried out by conventional means with little or no modfication. In one acceptable recovery process, the liquor is first filtered to remove suspended solids. It may then be treated by one of a variety of ways to remove slimes or to reduce the concentration thereof. For example, it can be treated with a small proportion of tannin or alkali lignin, as disclosed in Hoglan U.S. Patent 2,487,807 (November 15, 1949) and in Blish U.S. Patent 2,487,785 (November 15, 1949). Alternatively, it can be concentrated to a solids level of about 25–45% by weight, then commingled with a small proportion of barium chloride, barium hydroxide, or the like at a pH above 7 to precipitate organic impurities, as disclosed in Purvis-Fike U.S. Patent 2,796,433 (June 18, 1957). The purified liquor is then concentrated and adjusted to about pH 3.2 with sulfuric acid, hydrochloric acid, or the like, at which point L-glutamic acid crystallizes therefrom in good yield.

It has been found that, particularly with the higher concentration of sugars, bound glutamic acid as well as glutamic acid itself, may be produced by the organisms. Accordingly, if desired, the fermentation medium may be subjected to hydrolysis in order to hydrolyze the compounds to free glutamic acid. Once again, the hydrolysis may be carried out by conventional means such as, for example, the acid hydrolysis disclosed in U.S. Patent 2,548,124. In the event that the medium and fermentation conditions employed yield none or only insignificant quantities of bound glutamic acid values, then, of course, hydrolysis need not be employed.

The following examples are included in order more fully to demonstrate the practice of this invention. These examples are included for illustrative purposes only and in no way are intended to limit the scope of the invention.

Fifty liter stainless steel fermentors were employed and were initially charged with 10.5 gallons of aqueous nutrient medium. The initial medium was sterilized for thirty minutes at 121° C. and then inoculated with an inoculum containing *Corynebacterium lilium* at a temperature of from about 30 to about 32° C. The inoculum constituted about 10% by volume of the charge.

The 50 liter fermentors were equipped with four-blade 6" diameter agitators that were run at 300 r.p.m.

The glutamic acid content recited in the examples was determined, employing the standard glutamic acid decarboxylase procedure described, inter alia, in Agricultural and Food Chemistry, vol. 5, No. 6, p. 448, June 1957.

Example I

Ten and one-half liters of the following fermentation medium were introduced into the fermentor and sterilized:

| Fermentation medium: | Percent by weight of medium |
|---|---|
| $K_2HPO_4$ | 0.2 |
| $MgSO_4 \cdot 7H_2O$ | 0.2 |
| $(NH_4)_2SO_4$ | 0.1 |
| Corn steep solids | 0.2 |
| $FeSO_4$ | 0.01 |
| $CaCl_2$ | 0.025 |
| $MnSO_4 \cdot H_2O$ | 0.02 |
| Zinc acetate | 0.0005 |
| Sucrose (as Cerelose) | 16.3 |
| Biotin (purified), 3.5γ/liter. | |

The pH of the medium was controlled at about 7.0 with ammonia and the fermentation was permitted to proceed for 45 hours after which no significant accumulation of glutamic acid occurred.

Analysis of the fermentation liquor indicated a yield of glutamic acid values of 68.7 mg./ml. Of the glutamic acid compounds present, 68% by weight were present as free glutamic acid. Based on the initial 16.3% sugar in the solution, the yield represented a molecular conversion of 56.1%.

Example II

In order to demonstrate the advantages of this invention, a second fermentation was conducted employing the following 10.5 gal. initial medium:

| Fermentation medium: | Percent by weight of medium |
|---|---|
| $K_2PO_4$ | 0.2 |
| $MgSO_4 \cdot 7H_2O$ | 0.2 |
| $(NH_4)_2SO_4$ | 0.1 |
| Corn steep solids | 0.2 |
| $FeSO_4$ | 0.01 |
| $CaCl_2$ | 0.025 |
| $MnSO_4 \cdot H_2O$ | 0.02 |
| Zinc acetate | 0.0005 |
| Sucrose (as Cerelose) | 2 |
| Biotin (purified), 3.5γ/liter. | |

The medium was sterilized and maintained at about ph 7.0 with ammonia throughout the fermentation.

Between 5 and 25 hours 791 cc. of a 50% aqueous solution of Cerelose was fed incrementally to the medium. Between 27 and 41 hours an additional 475 cc. of 50% aqueous Cerelose was fed to the medium. The feeding was stopped at 41 hours and fermentation was terminated at 45 hours.

Throughout the fermentation, a total of 16.9% sugar was present and consumed in the fermentation medium. The final fermentation medium contained 71.4 mg./ml. glutamic acid values of which 72.2% were free glutamic acid. This yield represented a molecular conversion of 73.1% as contrasted to the 56.1% molecular conversion obtained in Example I.

Example III

A batch fermentation was conducted employing 10.5 gallons of the following medium:

| Fermentation medium: | Percent by weight of medium |
|---|---|
| $K_2HPO_4$ | 0.2 |
| $MgSO_4 \cdot 7H_2O$ | 0.2 |
| $(NH_4)_2SO_4$ | 0.1 |
| Corn steep solids | 0.2 |
| $FeSO_4$ | 0.01 |
| $CaCl_2$ | 0.025 |
| $MnSO_4 \cdot H_2O$ | 0.02 |
| Zinc acetate | 0.0005 |
| Beet molasses | 30 |

The fermentation was conducted at a pH of about 7.0 for a total of 45 hours. The beet molasses contained 50% sucrose and 0.043γ/gram of biotin so that the fermentor contained 15% sugar and 13.0γ/liter of biotin.

At the termination of the fermentation, the medium contained 8.8 g./ml. of glutamic acid values of which only 14.8% were present as free glutamic acid.

Example IV

A second fermentation was conducted utilizing an incremental feed of beet molasses. The composition of the initial nutrient medium was as follows:

| Fermentation medium: | Percent by weight of medium |
|---|---|
| $K_2HPO_4$ | 0.2 |
| $MgSO_4 \cdot 7H_2O$ | 0.2 |
| $(NH_4)_2SO_4$ | 0.1 |
| Corn steep solids | 0.2 |
| $FeSO_4$ | 0.01 |
| $CaCl_2$ | 0.025 |
| $MnSO_4 \cdot H_2O$ | 0.02 |
| Zinc acetate | 0.0005 |
| Sucrose (as Cerelose) | 0.5 |

After an initial induction period of 5 hours, the incremental feeding of beet molasses was started. Between 5 and 25 hours 475 cc. of beet molasses was fed to the medium. Between 27 and 41 hours an additional 285 cc. of beet molasses was fed incrementally to the medium. Feeding terminated after 41 hours and the fermentation was terminated after 45 hours.

The molasses employed as the raw material contained approximately 0.04γ/gram so that the total biotin added to the fermentation was approximately 10.38γ/liter.

The final fermentation broth contained 50.9 mg./ml. of glutamic acid values of which essentially 100% were free glutamic acid. This yield represents a 73.6% molecular conversion. A total of 13.06% sugar was fed throughout the process.

Since variations of this invention will be apparent to those skilled in the art, it is intended that the scope of this invention be limited only by the appended claims.

We claim:

1. In the method of producing glutamic acid by aerobic fermentation employing a microorganism selected from the group consisting of *Corynebacterium lilium* and *Corynebacterium callunae* in an aqueous carbohydrate medium containing a nitrogen source, the improvement of establishing an initial fermentation medium containing a carbohydrate in an amount less than about 3 weight percent and containing biotin in an amount less than about 10 gamma per liter and after an initial growth period of from about 1 to about 8 hours incrementally adding a carbohydrate containing from about 0.02 to about 0.3 gamma of biotin per gram to maintain the carbohydrate level in the medium at not more than about 1 weight percent.

2. The method of claim 1 wherein a total of at least 7.5 weight percent of carbohydrate is added during the fermentation.

3. The method of claim 2 wherein a carbohydrate containing from about 0.03 to about 0.17 gamma per gram is added incrementally to maintain the carbohydrate level in the medium at not more than about 0.5 weight per cent.

4. The method of claim 2 wherein beet molasses is added incrementally to the medium.

References Cited by the Examiner
UNITED STATES PATENTS 3,066,078  11/1962  Miescher _____ 195—47
3,087,863   4/1963  Lee et al. _____ 195—47

A. LOUIS MONACELL, *Primary Examiner.*

ABRAHAM H. WINKELSTEIN, *Examiner.*

L. M. SHAPIRO, *Assistant Examiner.*